US007156137B2

(12) United States Patent
Corvasce et al.

(10) Patent No.: US 7,156,137 B2
(45) Date of Patent: Jan. 2, 2007

(54) PREPARATION OF STARCH REINFORCED RUBBER AND USE THEREOF IN TIRES

(75) Inventors: Filomeno Gennaro Corvasce, Mertzig (LU); Fernand Antoine Joseph Fourgon, Bastogne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 147 days.

(21) Appl. No.: 11/071,822

(22) Filed: Mar. 3, 2005

(65) Prior Publication Data

US 2005/0148699 A1    Jul. 7, 2005

Related U.S. Application Data

(62) Division of application No. 10/222,741, filed on Aug. 16, 2002, now Pat. No. 6,878,760.

(60) Provisional application No. 60/322,117, filed on Sep. 14, 2001.

(51) Int. Cl.
*B60C 1/00* (2006.01)
*C08L 99/00* (2006.01)
*C08L 3/00* (2006.01)
*C08K 3/34* (2006.01)

(52) U.S. Cl. ............... 152/525; 152/151; 152/450; 152/451; 152/548; 152/565; 152/905; 524/27; 524/47; 524/492; 524/493; 524/495

(58) Field of Classification Search .............. 152/450, 152/525, 151, 451, 548, 565, 905; 524/27, 524/47, 492, 493, 495
See application file for complete search history.

(56) References Cited

U.S. PATENT DOCUMENTS

| 3,873,489 | A | 3/1975 | Thurn et al. ............... 260/33.6 |
| 4,076,550 | A | 2/1978 | Thurn et al. ............ 106/288 Q |
| 4,704,414 | A | 11/1987 | Kerner et al. ............... 523/213 |
| 4,900,361 | A | 2/1990 | Sachetto et al. ............ 106/213 |
| 5,258,430 | A | 11/1993 | Bastioli et al. ............... 524/52 |
| 5,374,671 | A | 12/1994 | Corvasce et al. ............ 504/47 |
| 5,580,919 | A | 12/1996 | Agostini et al. ........... 524/430 |
| 5,672,639 | A | 9/1997 | Corvasce et al. ............ 524/52 |
| 5,674,932 | A | 10/1997 | Agostini et al. ........... 524/430 |
| 6,273,163 | B1 | 8/2001 | Materne et al. ............ 152/548 |

FOREIGN PATENT DOCUMENTS

| EP | 763558 | 3/1997 |
| EP | 1038697 | 9/2000 |

*Primary Examiner*—Ana Woodward
(74) *Attorney, Agent, or Firm*—Henry C. Young, Jr.

(57) ABSTRACT

The invention relates to a rubber composition which contains starch/plasticizer composite, precipitated silica and carbon black reinforcement together with a coupling agent wherein the coupling agent is an organosilane polysulfide having an average of from about 2 to about 2.6 connecting sulfur atoms in its polysulfidic bridge. The invention provides for a chemical reaction between a coupling agent and silica which is substantially decoupled from a reaction between a coupling agent and starch/plasticizer to form a filler reinforcement network in situ within the elastomer host followed by a subsequent phase mixing of the carbon black therewith. The invention further relates to the resulting rubber composition and articles of manufacture, including tires, having at least one component comprised of said rubber composition.

11 Claims, No Drawings

PREPARATION OF STARCH REINFORCED RUBBER AND USE THEREOF IN TIRES

This is a Divisional of application Ser. No. 10/222,741, filed on Aug. 16, 2002, now U.S. Pat. No. 6,878,760.

This application claims the benefit of U.S. Provisional Application Ser. No. 60/322,117, filed on Sep. 14, 2001.

FIELD OF THE INVENTION

The invention relates to a rubber composition which contains starch/plasticizer composite, precipitated silica and carbon black reinforcement together with a coupling agent wherein the coupling agent is an organosilane polysulfide having an average of from about 2 to about 2.6 connecting sulfur atoms in its polysulfidic bridge. The invention provides for a chemical reaction between a coupling agent and silica which is substantially decoupled from a reaction between a coupling agent and starch/plasticizer to form a filler reinforcement network in situ within the elastomer host followed by a subsequent phase mixing of the carbon black therewith. The invention further relates to the resulting rubber composition and articles of manufacture, including tires, having at least one component comprised of said rubber composition.

BACKGROUND OF THE INVENTION

Starch/plasticizer composites have been suggested for use in elastomer compositions for various purposes, including tires For example, see U.S. Pat. No. 5,672,639. In U.S. Pat. No. 6,273,163, a first and second coupling agent are sequentially mixed with the rubber composition, thereby substantially decoupling the action of the first coupling agent from the action of the second coupling agent. Various other U.S. patents, for example, U.S. Pat. Nos. 5,403,923, 5,374,671, 5,258,430 and 4,900,361 disclose preparation and use of various starch materials. As pointed in the aforesaid U.S. Pat. No. 5,672,639, starch may represented, for example, as a carbohydrate polymer having repeating units of amylose (anydroglucopyranose units joined by glucosidic bonds) and amylopetin, a branched chain structure, as is well known to those having skill in such art. Typically, starch may be composed of about 25 percent amylose and about 75 percent amylopectin. *The Condensed Chemical Dictionary*, Ninth Edition (1977), revised by G. G. Hawley, published by Van Nostrand Reinhold Company, Page 813. Starch can be, reportedly, a reserve polysaccharide in plants such as, for example, corn, potatoes, rice and wheat as typical commercial sources.

As discussed in U.S. Pat. No. 5,672,639 a coupling agent in a form of a bis(3-trialkoxysilylalkyl)polysulfide which has an average of from 2 to about 2.6 connecting sulfur atoms in its polysulfidic bridge may be preferred over such polysulfide which has a greater plurality, such as an average of from 3.5 to 4 connecting sulfur atoms because of a lower viscosity buildup, because of less free sulfur generation during the non-productive mixing phase by using the coupling agent with a substantially lower plurality of connecting sulfur atoms.

Accordingly, it is considered herein that, for an organosilane polysulfide which contains an average of only about 2.6 or less, and particularly within a range of about 2 to about 2.6, sulfur atoms in its polysulfidic bridge, the liberation of free sulfur, if any, occurs at a relatively slow rate during a high shear rubber mixing stage, even at a mixing temperature in a range of about 150° C. to about 185° C. depending somewhat upon the overall mixing conditions, including the mixing time itself.

Bis-(3-triethoxysilylpropyl)disulfide, as a variety of organosilane disulfide, is also taught as being useful in silica-containing sulfur-vulcanizable elastomer compositions, even as a high purity form of such disulfide in, for example, U.S. Pat. No. 4,076,550 and German Patent Publication DT 2,360,471.

For further examples of organosilane polysulfides for use as silica couplers, see U.S. Pat. Nos. 4,076,550, 4,704,414 and 3,873,489.

For examples of organosilane disulfides added in a preparatory, non-productive, rubber composition mixing stage, along with a small amount of free sulfur, see U.S. Pat. Nos. 4,076,550, 5,580,919 and 5,674,932.

In practice, sulfur-vulcanized elastomer products are typically prepared by thermomechanically mixing rubber and various ingredients in a sequentially step-wise manner followed by shaping and curing the compounded rubber to form a vulcanized product.

First, for the aforesaid mixing of the rubber and various ingredients, typically exclusive of free sulfur and sulfur vulcanization accelerators, the elastomer(s) and various rubber compounding ingredients are typically blended in at least one, and usually at least two, sequential, preparatory thermomechanical mixing stage(s) in suitable mixers, usually internal rubber mixers. Such preparatory mixing is often referred to as "non-productive mixing", or "non-productive mixing steps or stages". Such preparatory mixing may be conducted, for example, at temperatures in a range of about 100° C. to 190° C. and more often in a range of about 140° C. to about 170° C.

Subsequent to such sequential preparatory mix stage(s), free sulfur and sulfur vulcanization accelerators, and possibly one or more additional ingredients, are mixed with the rubber compound, or composition, in a final productive mix stage, typically at a temperature within a range of about 100° C. to about 130° C., which is a lower temperature than the temperatures utilized in the aforesaid preparatory mix stage(s) in order to prevent or retard premature curing of the sulfur-curable rubber, which is sometimes referred to as "scorching", of the rubber composition.

Such sequential, non-productive, mixing steps, and the subsequent productive mixing step are well known to those in the rubber mixing art.

By thermomechanical mixing, it is meant that the rubber compound, or composition of rubber and rubber compounding ingredients, is mixed in a rubber mixture under high shear conditions where the rubber composition autogeneously heats up, with an accompanying temperature rise, as a result of the mixing primarily due to shear and associated friction within the rubber mixture in the rubber mixer.

Such thermomechanical rubber compound mixing procedure and associated shear and accompanying temperature rise aspects are well known to those having experience in the rubber preparation and mixing art.

It is believed that the prescribed procedure of substantial decoupling of coupling agent reaction with the precipitated silica and reaction with a starch/plasticizer followed by blending carbon black wherewith is novel and inventive in view of past practice.

The term "phr" as used herein, and according to conventional practice, refers to "parts by weight of a respective material per 100 parts by weight of rubber, or elastomer".

In the description of this invention, the terms "rubber" and "elastomer" if used herein, may be used interchangeably, unless otherwise prescribed. The terms such as "rubber composition", "compounded rubber" and "rubber compound", if used herein, are used interchangeably to refer to "rubber which has been blended or mixed with various ingredients and materials" and "rubber compounding" or "compounding" may be used to refer to the "mixing of such materials". Such terms are well known to those having skill in the rubber mixing or rubber compounding art.

A reference to the "Tg" of an elastomer, if used herein, refers to a "glass transition temperature" which can be determined by a differential scanning calorimeter at a heating rate of 10° C. per minute.

SUMMARY AND PRACTICE OF THE INVENTION

In accordance with this invention, a rubber composition, and a method of preparation, is provided which contains a reinforcing filler network formed in situ within an elastomer host, and a carbon black subsequently phased mixed therewith said rubber composition is prepared by, based upon parts by weight per 100 parts by weight rubber (phr):

(A) thermomechanically mixing a rubber composition, preferably within an internal rubber mixer in a preparatory mixing stage from an initial temperature of less than about 50° C., usually from about 18° C. to about 40° C., to an autogeneously generated temperature thereof, as the rubber mixture is being mixed therein, in a range of about 120° C. to about 170° C., usually about 140° C. to about 170° C., in the absence of addition of free sulfur, to form a first phase of at least one elastomer containing an in situ formed reinforcing filler network therein, and based upon parts by weight per 100 parts by weight rubber (phr):

(1) 100 parts by weight of at least one diene-based elastomer selected from conjugated diene homopolymers and copolymers and copolymers of at least one conjugated diene and aromatic vinyl compound, (2) about 40 to about 60, alternately about 45 to about 55 phr of a synthetic, precipitated silica having hydroxyl groups (e.g. silanol groups) on the surface thereof, (3) about one to about 10, alternatively about 5 to about 9, phr starch/plasticizer composite which contains hydroxyl groups on the surface thereof, and (4) a coupling agent comprised of a bis(3-trialkoxysilylpropyl)polysulfide which contains an average of from about 2 to 2.6 connecting sulfur atoms in its polysulfidic bridge, wherein said filler network is comprised of a treated silica composite and a treated starch/plasticizer composite and is formed in situ within the elastomer host by reaction of a portion of the alkoxy groups of said coupling agent with a major portion of hydroxyl groups on the surface of said precipitated silica at an autogeneously generated mixing temperature primarily in a range of up to about 150° C., and possibly higher, and believed to be primarily in a range of about 140° C. to about 150° C., to form a treated silica composite and wherein a substantial portion of the remaining alkoxy groups of said coupling agent react with a major portion of hydroxyl groups of said starch/plasticizer composite at an autogeneously generated mixing temperature primarily in a range of about 150° C. to about 170° C., although some degree of such reaction is believed to occur at temperatures somewhat higher and lower than such temperature range, to thereby form a treated starch/plasticizer composite, followed by (B) thermomechanically mixing therewith in a subsequent mixing stage, from a temperature of less than about 50° C., and generally in a range of from 18° C. to about 40° C., with the temperature of the rubber mixture increasing autogeneously within an internal rubber mixer as the rubber mixture is being mixed therein, in the absence of addition of free sulfur, to a temperature in a range of about 120° C. to about 170° C. and about 20 to about 40, alternately about 24 to about 30, phr of rubber reinforcing carbon black, followed by (C) thermomechanically mixing sulfur and at least one sulfur vulcanization accelerator therewith in a subsequent mixing stage with in an internal rubber mixer from a temperature of less than about 50° C., and generally a temperature in a range of about 18° C. to about 50° C., with temperature of the rubber mixture increasing autogeneously within an internal rubber mixer, to a temperature in a range of about 120° C. to about 170° C.

wherein the respective rubber mixtures are removed from the internal rubber mixers and allowed to cool to 50° C. or less between mixing steps.

Preferably said starch is comprised of amylose units and amylopectin units in a ratio of about 15/85 to about 35/65 and has a softening point according to ASTM No. D1228 in a range of about 180° C. to about 220° C. and where said starch/plasticizer composite has a softening point, reduced from said starch alone, in a range of about 110° C. to about 170° C. according to ASTM No. D1228 which is considered herein to be necessary or desirable to provide the starch/plasticizer composite softening point to approach of to be within the temperature region used for the mixing of the rubber composition itself.

In practice, between each mixing step the rubber composition is allowed to cool to a temperature below about 40° C. such as, for example, within a range of about 20° C., to about 40° C.

In practice, the total mixing time for said preparatory (non-productive) mixing steps may be, for example, in a range of about two to about 20, alternatively about four to about 15, minutes and about one to about three minutes for said subsequent (productive) mixing step.

While the mechanism may not be entirely understood, it is believed that the alkoxy groups of the organosilane polysulfide coupling agent readily and substantially react with the hydroxyl groups of the precipitated silica at a temperature in a range of about 40° C. to about 150° C. and therefore substantially prior to, although possibly not completely prior to, an appreciable reaction of said alkoxy groups of the starch/plasticizer composite at a temperature in a range of about 140° C. to about 170° C. as the temperature of the rubber mixture autogeneously increases within the internal rubber mixer. Such reaction with the starch/plasticizer composite is understood to be accompanied with an increase of rubber viscosity history within the internal rubber mixer whereas the more initial reaction with the precipitated silica is understood to be accompanied with less of an increase of rubber viscosity history with the internal rubber mixer. Therefore, it is seen herein that the reaction of the coupling agent with the limited number of connecting sulfur atoms in its polysulfuric bridge, is substantially decoupled from its reaction with the starch/plasticizer composite, all in situ within the elastomer host.

Interestingly, the carbon black addition subsequent to the aforesaid silica and starch/plasticizer treatments by the coupling agent appears to be in a manner of a phase mixing step in which the carbon black is mixed with said already treated reinforcing hydrophillic filler phase (silica and starch/plasticizer composite) in situ within the elastomer host. Accordingly, the carbon black is dispersed within the elastomer host not as a simple blend therewith but after the said in situ formation of a treated silica and treated starch/plasticizer composite dispersion or network with the elastomer host. Thus, it is not a matter of simple dispersion of carbon black within the elastomer but the dispersion of carbon black into an elastomer which already contains a dispersion of the in situ treated silica and starch/plasticizer composite. One interesting observation resulting therefrom, is an increase in electrical conductivity, or decrease in electrical resistivity, of a rubber composition, thereby indicating an interesting phenomenon of enabling the added carbon black dispersion after said in situ treatment of reinforcing fillers.

For the organosilane polysulfide coupling agent, the alkoxy groups of said alkoxysilane are typically selected from methyl and ethyl groups, preferably an ethyl group. The alkyl group for said silylalkyl component is preferably selected from methyl, ethyl, propyl and butyl groups, preferably a propyl group.

Accordingly, a preferred alkoxysilane polysulfide is a bis(3-triethoxysilylpropyl)polysulfide with the required average of from 2 to 2.6 connecting sulfur atoms in its polysulfidic bridge which is exclusive of a bis(3-trialkoxysilylalkyl)polysulfide having an average of 3.5 to 4 connecting sulfur atoms.

Significantly, the coupling agent is required to have an average of from 2 to 2.6 connecting sulfur atoms in its polysulfidic bridge. While, the coupling agent may contain from 2 to 6 sulfur atoms in its polysulfidic bridge, nevertheless, the average is required to be a maximum of 2.6 and is therefore intended to exclude bis(3-trialkylsilylalkyl) polysulfides which contain an average above 2.6 and particularly those which contain an average between 3.5 and 4, of connecting sulfur atoms in its polysulfidic bridge. In particular, it is intended to exclude what might be referred to as a bis(3-triethoxysilylpropyl)tetrasulfide which may actually contain an average of from 3.5 to 4 connecting sulfur atoms in its polysulfidic bridge.

An overall philosophy of this invention is considered herein to be in a sense of separately and selectively initially promoting an initial silane reaction between the coupling agent, with a substantially decoupled reaction thereof with the starch/plasticizer composite, without appreciable premature release of free sulfur, followed by a subsequent blending of carbon black therewith.

A particular benefit is seen from decoupling the action is to allow the alkoxy groups of the coupling agent to be allowed to first react with the hydroxyl groups of the silica so that the hydroxyl groups of the precipitated silica do not unnecessarily compete with the hydroxyl groups of the starch/plasticizer composite for said alkoxy groups of the first coupling agent. Thereafter, as the starch/plasticizer in a form, for example, of pellets, softens within the rubber mixture as the inherently autogeneously generated temperature increase caused by the physical, relatively high shear mixing of the rubber composition being mixed within the internal rubber mixer, the hydroxyl groups of the starch/plasticizer composite become more readily available to react with the alkoxy groups of the coupling agent.

Therefore, by this decoupling method, the hydroxyl groups of the starch/plasticizer are not allowed to dominate the reaction with the alkoxy groups of the coupling agent to the exclusion of the hydroxyl groups of the precipitated silica.

In further accordance with this invention, a rubber composition is provided as being prepared according to the method of this invention.

In additional accordance with this invention, an article is provided having at least one component of said rubber composition.

In further accordance with this invention, a tire is provided having at least one component of said rubber composition.

In additional accordance with this invention, a tire is provided having a tread of said rubber composition, particularly where said tire tread is designed to be ground-contacting.

In one aspect, the prepared rubber composition is vulcanized in a suitable mold at an elevated temperature in a range of about 140° C. to about 185° C. or 190° C.

In additional accordance with the invention, the process comprises the additional steps of preparing an assembly of a tire of sulfur vulcanizable rubber with tread comprised of the said rubber composition prepared according to the process of this invention and vulcanizing the assembly at a temperature in a range of about 140° C. to about 185° C. or 190° C.

Accordingly, the invention also thereby contemplates a vulcanized tire prepared by such process.

As hereinbefore point out, the starch itself is typically composed of, for example, amylose units and amylopectin units in a ratio of about 15/85 to about 35/65, alternatively about 20/80 to about 30/70, and has a softening point according to ASTM No. D1228 in a range of about 180° C. to about 220° C.; and the starch/plasticizer composite has a softening point in a range of about 110° C. to about 170° C. according to ASTM No. D1228.

For the starch/plasticizer composite, in general, starch to plasticizer weight ratio is in a range of about 0.5/1 to about 4/1, alternatively about 1/1 to about 2/1, so long as the starch/plasticizer composition has the required softening point range, and preferably, is capable of being a free flowing, dry powder or extruded pellets, before it is mixed with the elastomer(s).

In practice, it is desired that the synthetic plasticizer itself is compatible with the starch, and has a softening point lower than the softening point of the starch so that it causes the softening of the blend of the plasticizer and the starch to be lower than that of the starch alone. This phenomenon of blends of compatible polymers of differing softening points having a softening point lower than the highest softening point of the individual polymer(s) in the blend is well known to those having skill in such art.

For the purposes of this invention, the plasticizer effect for the starch/plasticizer composite, (meaning a softening point of the composite being lower than the softening point of the starch), can be obtained, for example, through use of a polymeric plasticizer such as, for example, poly(ethylenevinyl alcohol) with a softening point of less than 160° C. Other plasticizers, and their mixtures, are contemplated for use in this invention, provided that they have softening points of less than the softening point of the starch, and preferably less than 160° C., which might be, for example, one or more copolymers and hydrolyzed copolymers thereof selected from ethylene-vinyl acetate copolymers having a vinyl acetate molar content of from about 5 to about 90, alternatively about 20 to about 70, percent, ethylene-glycidal acrylate copolymers and ethylene-maleic anhydride copolymers. As hereinbefore stated, hydrolyzed forms of copolymers are also contemplated. For example, the corresponding ethylene-vinyl alcohol copolymers, and ethylene-acetate vinyl alcohol terpolymers may be contemplated so long as they have a softening point lower than that of the starch and preferably lower than 160° C.

In general, the blending of the starch and plasticizer involves what are considered or believed herein to be relatively strong chemical and/or physical interactions between the starch and the plasticizer.

Representative examples of synthetic plasticizers are, for example, poly(ethylenevinyl alcohol), cellulose acetate and diesters of dibasic organic acids, so long as they have a softening point sufficiently below the softening point of the starch with which they are being combined so that the starch/plasticizer composite has the required softening point range.

Preferably, the synthetic plasticizer is selected from at least one of poly(ethylenevinyl alcohol) and cellulose acetate.

For example, the aforesaid poly(ethylenevinyl alcohol) might be prepared by polymerizing vinyl acetate to form a poly(vinylacetate) which is then hydrolyzed (acid or base catalyzed) to form the poly(ethylenevinyl alcohol). Such reaction of vinyl acetate and hydrolyzing of the resulting product is well known those skilled in such art.

For example, vinylalcohol/ethylene (60/40 mole ratio) copolymers can conventionally be obtained in powder and in pellet forms at different molecular weights and crystallinities such as, for example, a molecular weight of about 11700 with an average particle size of about 11.5 microns or a molecular weight (weight average) of about 60,000 with an average particle diameter of less than 50 microns.

Various blends of starch and ethylenevinyl alcohol copolymers can then be prepared according to mixing procedures well known to those having skill in such art. For example, a procedure might be utilized according to a recitation in the patent publication by Bastioli, Bellotti and Del Trediu entitled A Polymer Composition Including Destructured Starch An Ethylene Copolymer, U.S. Pat. No. 5,403,374.

Other plasticizers might be prepared, for example and so long as they have the appropriate Tg and starch compatibility requirements, by reacting one or more appropriate organic dibasic acids with aliphatic or aromatic diol(s) in a reaction which might sometimes be referred to as an "esterification condensation reaction". Such esterification reactions are well known to those skilled in such art.

Vulcanization accelerators are conventionally added in the productive mixing stage. Some vulcanization accelerators are not conventionally considered as being sulfur donors in a sense of liberating free sulfur; it is appreciated that they may be, for example, of the type such as, for example, benzothiazole, alkyl thiuram disulfide, guanidine derivatives and thiocarbamates. Representative of such accelerators are, for example but not limited to, mercapto benzothiazole, tetramethyl thiuram disulfide, benzothiazole disulfide, diphenylguanidine, zinc dithiocarbamate, alkylphenoldisulfide, zinc butyl xanthate, N-dicyclohexyl-2-benzothiazole-sulfenamide, N-cyclohexyl-2-benzothiazolesulfenamide, N-oxydiethylenebenzothiazole-2-sulfenamide, N,N diphenylthiourea, dithiocarbamylesulfenamide, N,N diisopropyl-bezothiozole-2-sulfenamide, zinc-2-mercaptotoluimidazole, dithiobis(N methyl piperazine), dithiobis(N beta hydroxy ethyl piperazine) and dithiobis(dibenzyl amine). Such materials are understood herein to be well known as sulfur vulcanization accelerators for sulfur vulcanizable elastomers to those having skill in the rubber compounding art.

If desired, although not preferred in the practice of this invention, additional conventional sulfur donors may be added in the final, productive mixing stage, so long as the total amount of free sulfur added in the productive mixing stage and free sulfur liberated in the curing stage from the aforesaid organosilane polysulfide and the sulfur donor of this paragraph is in a range of about 0.13 to about 2.8 phr. Representative of such additional sulfur donors are, for example, thiuram and morpholine derivatives. Representative of such materials are, for example, dimorpholine disulfide, dimorpholine tetrasulfide, tetramethyl thiuram tetrasulfide, benzothiazyl-2,N dithiomorpholide, thioplasts, dipentamethylenethiurahexasulfide, and disulfidecaprolactame. Such materials are understood to be well known sulfur donors to those having skill in the rubber compounding art. To the extent that such sulfur donors are added in the productive mixing stage, the amount of free sulfur to be added is correspondingly reduced.

In further aspect of the invention, it is preferred that precipitated silica includes a co-precipitated combination of silica and aluminum with an aluminum content in a range of about 0.05 to about 10 percent of such silica/aluminum filler composite.

In the practice of this invention, as hereinbefore pointed out, the rubber composition is comprised of at least one diene-based elastomer, or rubber. Suitable conjugated dienes are isoprene and 1,3-butadiene and suitable vinyl aromatic compounds are styrene and alpha-methylstyrene. Thus, it is considered that the elastomer is a sulfur-curable elastomer. Such diene-based elastomer, or rubber, may be selected, for example, from at least one of cis 1,4-polyisoprene rubber (natural and/or synthetic), and preferably natural rubber), emulsion polymerization prepared styrene/butadiene copolymer rubber, organic solution polymerization prepared styrene/butadiene rubber, 3,4-polyisoprene rubber, isoprene/butadiene rubber, styrene/isoprene/butadiene terpolymer rubbers, cis 1,4-polybutadiene, medium vinyl polybutadiene rubber (35 to 50 percent vinyl), high vinyl polybutadiene rubber (50 to 75 percent vinyl), styrene/isoprene copolymers, emulsion polymerization prepared styrene/butadiene/acrylonitrile terpolymer rubber and butadiene/acrylonitrile copolymer rubber.

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50 percent.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

As hereinbefore discussed, the precipitated silicas employed in this invention are precipitated silicas such as, for example, those obtained by the acidification of a soluble silicate, e.g., sodium silicate. Such precipitated silicas are well known to those having skill in such art. Also, as hereinbefore discussed, a variation of precipitated silica is obtained by co-precipitating silica and aluminum.

Such precipitated silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 100 to about 350, and more usually about 150 to about 300 ml/100 g.

Further, the silica, as well as the aforesaid alumina and aluminosilicate, may be expected to have a CTAB surface area in a range of about 100 to about 220. The CTAB surface area is the external surface area as evaluated by cetyl trimethylammonium bromide with a pH of 9. The method is described in ASTM D 3849 for set up and evaluation. The CTAB surface area is a well known means for characterization of silica.

Mercury surface area/porosity is the specific surface area determined by Mercury porosimetry. For such technique, mercury is penetrated into the pores of the sample after a thermal treatment to remove volatiles. Set up conditions may be suitably described as using a 100 mg sample; removing volatiles during two hours at 105° C. and ambient atmospheric pressure; ambient to 2000 bars pressure measuring range. Such evaluation may be performed according to the method described in Winslow, Shapiro in ASTM bulletin, Page 39 (1959) or according to DIN 66133. For such an evaluation, a CARLO-ERBA Porosimeter 2000 might be used.

The average mercury porosity specific surface area for the precipitated silica should desirably be in a range of about 100 to 300 m$^2$/g.

A suitable pore size distribution for the silica, alumina and aluminosilicate according to such mercury porosity evaluation is desirably considered herein to be: five percent or less of its pores have a diameter of less than about 10 nm; 60 to 90 percent of its pores have a diameter of about 10 to about 100 nm; 10 to 30 percent of its pores have a diameter of about 100 to about 1,000 nm; and 5 to 20 percent of its pores have a diameter of greater than about 1000 nm.

Various commercially available silicas may be considered for use in this invention such as, only for example herein, and without limitation, silicas commercially available from PPG Industries under the Hi-Sil trademark with designations Hi-Sil 210, 243, etc; silicas available from Rhodia, with, for example, designation of Zeosil® 1165 MP and Zeosil® 165GR, silicas available from Degussa with, for example, designations VN2 and VN3, etc and silicas commercially available from Huber having, for example, a designation of Hubersil 8745.

As hereinbefore discussed, the precipitated silica, for the purpose of this invention, may be a co-precipitated silica and aluminum. For example, see U.S. Pat. No. 5,723,529.

A process for such preparation might be described, for example, as by a co-precipitation by pH adjustment of a basic solution, or mixture, of silicate and aluminate also, for example, by a chemical reaction between $SiO_2$, or silanols on the surface of a silicon dioxide, and $NaAlO_2$. For example, in such co-precipitation process, the synthetic co-precipitated aluminosilicate may have about 85 to about 99, usually about 95 to about 99, percent of its surface composed of silica moieties and, correspondingly, about 99 to about 25, usually about 95 to about 99, percent of its surface composed of aluminum moieties.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of reinforcing type carbon blacks(s) for this invention, if used, are hereinbefore set forth. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include, for example, elemental sulfur (free sulfur) or sulfur donating vulcanizing agents, for example, an amine disulfide, polymeric polysulfide or sulfur olefin adducts which are conventionally added in the final, productive, rubber composition mixing step. Preferably, in most cases, the sulfur vulcanizing agent is elemental sulfur. Of course, in the practice of this invention, the addition of free sulfur in the productive stage of mixing as well as the addition of the second coupling agent are specifically prescribed.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The rubber composition of this invention can be used for various purposes. For example, it can be used for various tire compounds. Such tires can be built, shaped, molded and cured by various methods which are known and will be readily apparent to those having skill in such art.

The following examples are presented in order to further illustrate the invention. The parts and percentages are by weight unless otherwise indicated.

EXAMPLE I

Rubber compositions were prepared by blending emulsion polymerization prepared styrene/butadiene rubbers (E-SBR's) together with cis 1,4-polybutadiene rubber and identified herein as Samples A and B, with Sample A being a Control Sample.

Both Control Sample A and Sample B contained starch/plasticizer, precipitated silica and carbon black reinforcement. However, the sequence of mixing the reinforcements was completely different.

In particular, for Control Sample A, the carbon black was conventionally mixed with the elastomers in a non-productive mixing stage followed by mixing the silica and starch/plasticizer therewith in a subsequent mixing stage after removing the carbon black containing mixture from the first mixing stage and allowing the mixture to cool.

For Sample B, precipitated silica and starch/plasticizer composite were mixed in a first non-productive mixing stage in an internal rubber mixer together with the coupling agent and the temperature of the mixture, as it was being mixed, allowed to autogeneously increase from about 23° C. to about 170° C. over a period of about four minutes. It is considered herein that during said mixing, the alkoxy groups of said coupling agent, in a substantial manner, first react with the hydroxyl groups contained on the surface of the precipitated silica as the temperature increases from about 23° C. to about 150° C. and reacts with hydroxyl groups of the starch/plasticizer composite as the composite softens primarily in a range of about 150° C. to about 170° C. so that the reactions of the silica and starch/plasticizer are substantially decoupled.

The mixture was removed from the internal rubber mixer, for Sample B, upon reaching a temperature of about 170° C. and allowed to cool to a temperature of about 40° C. Thereafter, and in a subsequent mixing stage carbon black is added to the mixture in an internal rubber mixer and the mixture temperature allowed autogeneously increase to about 170° C. at which the rubber is removed from the mixer and allowed to cool to about 40° C.

The Samples where then blended with free sulfur (productive mixing) in an internal rubber mixer for about two minutes to a temperature of about 110° C.

The ingredients are illustrated in the following Table 1.

TABLE 1

| Materials | Parts Control Sample A | Sample B |
|---|---|---|
| First Non-Productive Mix Step | | |
| E-SBR rubber[1] | 40 | 40 |
| E-SBR rubber[2] | 35 | 35 |
| Polybutadiene rubber[3] | 25 | 25 |
| Starch/Plasticizer composite[4] | 8 | 8 |
| Silica[5] | 0 | 50 |
| Carbon black (N134) | 24 | 0 |
| Coupling agent[5] | 2.6 | 10.6 |
| Oil, rubber processing | 3 | 4 |

TABLE 1-continued

| Materials | Parts Control Sample A | Sample B |
|---|---|---|
| Second Non-Productive Mix Step | | |
| Oil, rubber processing | 4 | 3 |
| Silica[5] | 50 | 0 |
| Coupling agent[6] | 8 | 0 |
| Carbon black (N134)[7] | 0 | 24 |
| Third Non-Productive Mix Step | | |
| Wax | 2 | 2 |
| Antidegradants | 2.5 | 2.5 |
| Productive Mix Step | | |
| Sulfur | 1.4 | 1.4 |
| Accelerator[8] | 4.6 | 4.6 |
| Zinc oxide | 3 | 3 |
| Stearic acid | 3.5 | 3.5 |

[1]An emulsion polymerization prepared styrene/butadiene rubber which contains about 31.5 percent styrene and having a Tg (glass transition temperature of about −42° C.)
[2]An emulsion polymerization prepared styrene/butadiene rubber which contains about 23.5 percent styrene and having a Tg (glass transition temperature of about −48° C.) as an SBR1712
[3]Cis 1,4-polybutadiene rubber as Budene 1254 from The Goodyear Tire & Rubber Company and having a glass transition temperature of about −104° C.
[4]Obtained as Mater-Bi 1128RR from the Novamont company as being composed of starch and plasticizer in a weight ratio of about 60/4 with a ethylene vinylalcohol plasticizer.
[5]Silica as Zeosil1165MP from Rhodia
[6]X266S from Degussa as a composite of 50/50 weight ratio of bis(3-theethoxysilylpropoyl) disulfide and carbon black and thus 50 percent active.
[7]Carbon black as N134, an ASTM designation, identified as typically having a dibutylthalate (DBF) value (ASTMD2414) of about 127, and Iodine value (ASTMD1510) of about 142 and a CTAB value of about 134.
[8]Of the sulfenamide, diphenyl guanidine, benzothiozole types The rubber compositions were vulcanized for about 18 minutes at a temperature of about 150° C. Various of the physical properties of the vulcanized rubber samples are shown in the following Table 2.

TABLE 2

| Properties | Parts Control Sample A | Sample B |
|---|---|---|
| Modulus, 300% (MPa) | 10.5 | 10 |
| Ultimate tensile (MPa) | 15.2 | 14.1 |
| Ultimate elongation (%) | 445 | 428 |
| Hardness, Shore A | 67.3 | 63.6 |
| Rebound (23° C.) | 34.4 | 36.2 |
| Rebound (100° C.) | 60.2 | 63 |
| Compression set (14 minutes at 160° C.) (percent) | 15.8 | 14.4 |
| DIN abrasion (cm³ loss) | 136 | 126 |
| Specific gravity | 1.174 | 1.166 |
| Goodrich blowout test (14 min. at 160° C.) | | |
| Time to blowout (minutes) | 43.9 | 55.6 |
| Metravib (14 minutes at 160° C.) | | |
| (6% strain/7.8 hertz/−10° C.) | | |
| G' (MPa) | 4.82 | 4.18 |
| G" (MPa) | 2.51 | 2.17 |
| Tan Delta | 0.521 | 0.519 |
| (6% strain/7.8 hertz/0° C.) | | |
| G' (MPa) | 3.9 | 3.53 |
| G" (MPa) | 1.71 | 1.51 |
| Tan Delta | 0.439 | 0.428 |

TABLE 2-continued

|  | Parts | |
|---|---|---|
| Properties | Control Sample A | Sample B |
| (6% strain/7.8 hertz/+50°C.) | | |
| G' (MPa) | 2.16 | 2.91 |
| G" (MPa) | 0.566 | 0.471 |
| Tan Delta | 0.262 | 0.247 |
| Electrical Resistivity (ohms) | | |
| Surface resistivity (similar to DIN53-482) | $5.28e^{13}$ | $2.40e^{9}$ |

It can be seen from Table 2 that the DIN abrasion value for Sample B was greatly improved as compared to Control Sample A (a 126 cm$^3$ loss for Sample B as compared to a greater loss of 136 cm$^3$ for Control Sample A).

This is considered herein to be significant as being predictive of greater treadwear for a tire with a tread of such rubber composition.

It can be seen from Table 2 that the hot rebound value for Sample B was greatly improved over Control Sample A (a value of 63 for Sample B as compared to a value of 60.2 for Control Sample A).

This is considered herein to be significant because it indicates a lower hysteresis for Sample B thereby being predictive of a tire with lower rolling resistance for a tire with tread of such rubber composition.

It can be seen from Table 2 that the storage modulus (G') is increased with a reduced Tan Delta at 50° C. for Sample B, as compared to Control Sample A, which is predictive of a reduced rolling resistance property for a tire having a tread of such rubber composition while maintaining tire handling properties.

The low temperature storage modulii (G') at low temperatures of from zero to −10° C. are seen to be reduced with a maintained Tan Delta for Sample B, as compared to Control Sample A, thereby being predictive of better winter performance for a tire having a tread of such rubber composition.

It can be seen from Table 2 that the surface electrical resistivity for Sample B was far less than that of Control Sample A. (A value of $2.4e^{9}$ for Sample B as compared to a value of $5.28e^{13}$ for Control Sample A.)

This is considered herein to be significant because it illustrates that a rubber composition can be prepared which contains a relatively low carbon back content, namely about 24 phr, yet still has a relatively acceptable electrical conductivity (or resistivity).

EXAMPLE II

Tires of size 235/70R16 were prepared having treads of rubber composition similar to Sample B (referred to herein as Tire Y) and of a rubber composition similar to Control Sample A (referred to herein as Control Tire X) but without containing a starch/plasticizer composite and containing 40 phr of carbon black, 50 phr of silica and 8 phr of coupling agent.

Various properties of the tires are shown in the following Table 3 with a major portion of the properties for Control Tire X normalized to a value of 100 and the corresponding properties of Tire Y normalized to the associated Control Tire X property value of 100.

TABLE 3

| Property | Control Tire X | Tire Y |
|---|---|---|
| Rolling resistance rating with Control Tire A normalized to 100 | | |
| 60 min, 60 Kmph | 100 | 106.9 |
| 15 min, 90 Kmph | 100 | 107.8 |
| 15 min, 120 Kmph | 100 | 107 |
| 15 min, 150 Kmph | 100 | 106.8 |
| 15 min, 175 Kmph | 100 | 108 |
| Average rating | 100 | 107 |
| Road-test ratings (observations of vehicle ride with tires mounted on vehicle wheels, with a value of 8 being a maximum value attainable) | | |
| Comfort | 6 | 6 |
| Impact | 5.75 | 6 |
| Wheel rebound | 6 | 6 |
| Vibration | OK | OK |
| Tracking: | | |
| Even road | 6.5 | 6.25 |
| Uneven road | 5.75 | 5.75 |
| Pulling | OK | OK |
| Stability: | | |
| Lane change | 6.5 | 6 |
| Side stability | 6.5 | 6.25 |
| Fishtailing | 6 | 6 |
| Cornering: | | |
| Understeering | 5.5 | 6.25 |
| Oversteering | 6 | 6 |
| Wet braking with Tire X values normalized to 100: | | |
| Asphalt road | 100 | 101.5 |
| Concrete road | 100 | 99.7 |
| Snow handling with Tire X values normalized to 100: | | |
| General handling | 100 | 103.5 |
| Hill climbing | 100 | 106.9 |
| Ice handling with Tire X values normalized to 100: | | |
| General handling | 100 | 97 |
| Sand handling with Tire X values normalized to 100 | 100 | 110 |
| Treadwear (observed value where a higher value for this Table represents less tread loss and therefore greater resistance to treadwear, with Tire X value being normalized to 100) | | |
| 20,000 Kms | 100 | 109 |

It can be seen from Table 3 that the values reported for Tire Y are, in general, comparatively superior to those for Control Tire X.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a tread comprised of a rubber composition containing a reinforcing filler network formed in situ within an elastomer host, and a carbon black subsequently therewith, prepared by, based upon parts by weight per 100 parts by weight rubber (phr):

(A) thermomechanically mixing a rubber mixture within an internal rubber mixer in a preparatory mixing stage from an initial temperature of elastomers of said rubber mixture of less than about 50° C. to an autogeneously generated temperature thereof, as the rubber is being mixed therein, in a range of about 120° C. to about 170° C., in the absence of addition of free sulfur, to form a first phase of at least one elastomer containing an in situ formed reinforcing filler network therein wherein said rubber mixture is comprised of:
  (1) 100 parts by weight of at least one diene-based elastomer selected from conjugated diene homopolymers and copolymers and copolymers of at least one conjugated diene and aromatic vinyl compound,
  (2) about 40 to about 60 phr of a synthetic, precipitated silica having hydroxyl groups on the surface thereof,
  (3) about one to about 10 phr starch/plasticizer composite which contains hydroxyl groups on the surface thereof, and
  (4) a coupling agent comprised of a bis(3-trialkoxysilylpropyl)polysulfide which contains from 2 to about 6, with an average of from about 2 to about 2.6, connecting sulfur atoms in its polysulfidic bridge,
  wherein said filler network is comprised of a treated silica composite and a treated starch/plasticizer composite and is formed in situ within the elastomer host by a reaction of a portion of the alkoxy groups of said coupling agent with a major portion of hydroxyl groups on the surface of said precipitated silica during said thermomechanical mixing step at an autogeneously generated mixing temperature of up to about 150° C. to thereby form a treated silica composite and wherein a substantial portion of the remaining alkoxy groups of said coupling agent react with a major portion of hydroxyl groups of said starch/plasticizer composite at an autogeneously generated temperature in a range of about 150° C. to about 170° C. to thereby form a treated starch/plasticizer composite,
(B) subsequently thermomechanically mixing, in a subsequent mixing stage, with said first phase of elastomer which contains said in situ formed reinforcing filler network within an internal rubber mixer from an initial temperature of said rubber mixture of less than about 50° C. to an autogeneously generated temperature, as the rubber mixture is being mixed therein, in a range of about 120° C. to about 170° C. and in the absence of addition of free sulfur; about 20 to about 40 phr of rubber reinforcing carbon black, and
(C) subsequently thermomechanically mixing sulfur and at least one sulfur vulcanization accelerator with said carbon black-containing rubber mixture in a subsequent mixing stage within in an internal rubber mixer from an initial temperature of said rubber mixture of less than about 50° C. to an autogeneously generated temperature, as the rubber mixture is being mixed herein, in a range of about 100° C. to about 120° C.,
  wherein the respective rubber mixtures are removed from their associated internal rubber mixer after each of said mixing steps and allowed to cool to 50° C. or less between mixing steps.

2. The tire of claim 1 wherein for said rubber composition said coupling agent is exclusive of a bis(3-triethoxysilylpropyl)polysulfide which contains from about 2 to about 8, with an average of from 3.5 to 4, connecting sulfur atoms in its polysulfidic bridge.

3. The tire of claim 1 wherein for said rubber composition said starch of said starch/plasticizer composite is comprised of amylose units and amylopectin units in a ratio of about 15/85 to about 35/65 and has a softening point according to ASTM No. D1228 in a range of about 180° C. to about 220° C. and where said starch/plasticizer composite has a softening point, reduced from said starch alone, in a range of about 110° C. to about 170° C. according to ASTM No. D1228 which is considered herein to be necessary or desirable to provide the starch/plasticizer composite softening point to approach of to be within the temperature region used for the mixing of the rubber composition itself.

4. The tire of claim 1 wherein for said rubber composition said plasticizer of said starch/plasticizer composite is selected from at least one of poly(ethylenevinyl alcohol), cellulose acetate and diesters of dibasic organic acids having a softening point of less than 160° C. and sufficiently below the softening point of the starch with which they are being combined so that the starch/plasticizer composite has a softening point in a range of about 110° C. to about 170° C.

5. The tire of claim 1 wherein for said rubber composition said plasticizer of said starch/plasticizer composite is selected from at least one of poly(ethylenevinyl alcohol) and cellulose acetate having a softening point of less than about 160° C.

6. The tire of claim 1 wherein for said rubber composition said coupling agent is a bis(3-triethoxysilylpropyl)polysulfide.

7. The tire of claim 1 wherein for said rubber composition said precipitated silica is an aluminosilicate prepared by a co-precipitation of a silicate and aluminum electrolytes to form a silica/aluminum composite which contains from about 90 to about 99 weight percent aluminum.

8. The tire of claim 1 where, for said diene-based elastomer(s), said conjugated dienes are selected from isoprene and 1,3-butadiene and said vinyl aromatic compounds are selected from styrene and alpha-methylstyrene.

9. The tire of claim 1 where said diene-based elastomer(s) is selected from at least one of natural and synthetic cis 1,4-polyisoprene rubber, emulsion polymerization prepared styrene/butadiene copolymer rubber, organic solution polymerization prepared styrene/butadiene copolymer rubber, 3,4-polyisoprene rubber, isoprene/butadiene rubber, styrene/isoprene/butadiene terpolymer rubbers, cis 1,4-polybutadiene rubber, high vinyl polybutadiene rubber having a vinyl 1,2-content in a range of from about 25 to about 95 percent.

10. The tire of claim 1 wherein said rubber composition is sulfur vulcanized at a temperature in a range of from about 140° C. to about 190° C.

11. The tire of claim 1 prepared by the steps of shaping said rubber composition to form a tire tread stock, applying said tire tread stock to a rubber tire carcass to form an assembly thereof and molding and vulcanizing said assembly in a suitable mold to form a tire.

* * * * *